United States Patent
Tomei et al.

(10) Patent No.: US 12,549,333 B1
(45) Date of Patent: Feb. 10, 2026

(54) ERROR-AWARE HASHING ENGINE

(71) Applicant: Auradine, Inc., Santa Clara, CA (US)

(72) Inventors: Matthew Tomei, Santa Clara, CA (US); Saptadeep Pal, Cupertino, CA (US); David Carlson, Haslet, TX (US)

(73) Assignee: Auradine, Inc., Santa Clara, CA (US)

( * ) Notice: Subject to any disclaimer, the term of this patent is extended or adjusted under 35 U.S.C. 154(b) by 155 days.

(21) Appl. No.: 18/218,391

(22) Filed: Jul. 5, 2023

(51) Int. Cl.
*H04L 9/06* (2006.01)
*G06Q 20/38* (2012.01)

(52) U.S. Cl.
CPC ......... *H04L 9/0643* (2013.01); *G06Q 20/389* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 2007/0245141 A1* | 10/2007 | O'Keeffe | H04L 9/06 713/164 |
| 2019/0361486 A1* | 11/2019 | Malik | G06F 30/39 |
| 2022/0058167 A1* | 2/2022 | Suresh | G06F 16/2255 |
| 2024/0015005 A1* | 1/2024 | Song | H04L 9/0643 |

* cited by examiner

*Primary Examiner* — Philip J Chea
*Assistant Examiner* — James Ross Hollister
(74) *Attorney, Agent, or Firm* — Fish & Richardson P.C.

(57) ABSTRACT

An example system, includes clock synchronization circuitry, first data processing circuitry, and second data processing circuitry electrically coupled to the clock synchronization circuitry and the first processing circuitry. The clock synchronization circuitry is configured to receive a first signal, and output a second signal synchronized to a clock domain of the second data processing circuitry. The first data processing circuitry is configured to perform one or more first computations based on the first signal, and provide, to the second data processing circuitry, a result corresponding to the one or more first computations. The second data processing circuitry is configured to perform one or more second computations based on the second signal, determine whether the one or more second computations satisfies a selection criterion, and generate output data representing whether the one or more second computations satisfies the selection criterion.

20 Claims, 3 Drawing Sheets

ERROR-AWARE HASHING ENGINE

TECHNICAL FIELD

The following disclosure relates generally to electronic hashing engine circuits, such as those used to generate hashes for cryptographic operations.

BACKGROUND

In general, a hash function is a function that is used to map input data to an output. As an example, a hash function can receive input data having a particular sequence of characters and/or values, and output a corresponding sequence of characters and/or values (e.g., also referred to as hashes, hash values, hash codes, or digests).

In some implementations, a hash function can be a cryptographic hash function (e.g., a hash function that has certain properties that may be particularly suitable for a cryptographic application). As an example, in at least some cases, a cryptographic hash function can generate hashes in which the probability of a particular n-bit output result (hash) for a random input string is $2^2$, so that the hash can be used as a representative of the input string. Further, in at some implementations, a cryptographic hash function can generate hashes such that finding an input string that matches a given hash is unfeasible, assuming all input strings are equally likely. Further, in at some implementations, a cryptographic hash function can generate hashes such that it is infeasible to find a second input string that that matches a given hash when one input string is already known. Further, in at some implementations, a cryptographic hash function can generate hashes such that finding any pair of different input strings that yield the same hash value (also referred to as a "collision") is also unfeasible.

SUMMARY

The present disclosure describes methods, apparatuses, and system to generate hashes, such as hashes for cryptographic operations.

In an example implementation, a hashing engine circuitry is configured to receive an input signal from central control logic circuitry, perform hashing operations based on the input signal, and generate output data representing the results of the hashing operations. For instance, the hashing engine circuitry can generate output data indicating whether the results of the hashing operations meet certain selection criteria (e.g., selection criteria associated with "mining" a proof-of-work cryptocurrency, such as Bitcoin).

In some implementations, the central control logic circuitry and the hashing engine circuitry operate according to different clock domains. To mitigate metastability in the central control logic circuitry and the hashing engine circuitry, the input signals from the control logic circuitry can be synchronized with the clock domain of the hashing engine circuitry (e.g., using synchronization circuitry) before being provided to the hashing engine circuitry for processing. However, in some cases, the use of synchronization circuitry in this manner may increase the power drawn by the hashing engine circuitry and/or reduce the speed at which the hashing engine circuitry can generate hashes (e.g., compared to hashing engine circuitry that does not include such synchronization circuitry).

The present disclosure describes hashing engine circuitry that mitigates metastability between the central control logic circuitry and the hashing engine circuitry, without the use of synchronization circuitry between the primary hashing components of the hashing engine circuitry. As an example, the hashing engine circuitry includes core circuitry and verifier circuitry. The core circuitry is configured to receive an input signal directly from the central control logic circuitry (e.g., an input signal that has not been synchronized to the clock domain of the core circuitry), and generate one or more hashes using the input signal as an input. Further, upon determining that a generated hash meets certain selection criteria (e.g., selection criteria associated with "mining" a cryptocurrency with a proof-of-work consensus mechanism, such as Bitcoin), the core circuitry provides data regarding the generated hash to the verifier circuitry.

The verifier circuitry receives the data from the core circuitry, and verifies that the generated hash indeed meets the selection criteria. In particular, the verifier circuitry receives an instance of the input signal that has been synchronized to the clock domain of the verifier circuitry (e.g., using synchronization circuitry), and generates a hash using the synchronized input signal as an input. The verifier circuitry compares the generated hash to that generated by the core circuitry, and generates verification data indicating whether there is a match.

The implementations described herein can provide various technical benefits. For example, the hashing engine circuitry described herein can generate a greater number of hashes over a particular period of time (e.g., compared to hashing engine circuitry that do not have the arrangements described herein). As another example, the hashing engine circuitry described herein can generate a greater number of hashes using a particular power allotment (e.g., compared to hashing engine circuitry that do not have the arrangements described herein). Accordingly, the hashing engine circuitry can operate more effectively, while also using fewer resources.

In a general aspect, a system includes: clock synchronization circuitry; first data processing circuitry; and second data processing circuitry electrically coupled to the clock synchronization circuitry and the first processing circuitry. The clock synchronization circuitry is configured to: receive a first signal, and output a second signal synchronized to a clock domain of the second data processing circuitry. The first data processing circuitry is configured to: perform one or more first computations based on the first signal, and provide, to the second data processing circuitry, a result corresponding to the one or more first computations. The second data processing circuitry is configured to: perform one or more second computations based on the second signal, determine whether the one or more second computations satisfies a selection criterion, determine one or more errors associated with the one or more first computations by the first data processing circuitry, and generate output data based on the one or more errors.

Implementations of this aspect can include one or more of the following features.

In some implementations, the second data processing circuitry can be further configured to: compare the first result to a second result corresponding to the one or more second computations, and determine the one or more errors based on the comparison.

In some implementations, the second data processing circuitry can be further configured to: determine that the first result matches the second result, and in response to determining that the first result matches the second result, include at least one of the first result or the second result in the output data.

In some implementations, the second data processing circuitry can be further configured to: determine that the first result does not match the second result, and in response to determining that the first result does not match the second result, omit the first result and the second result from the output data.

In some implementations, performing the one or more first computations can include: generating a plurality of hash values based on the first signal, where each of the plurality of hash values is generated using a different respective nonce value as an input, and determining that a first hash value of the one or more hash values satisfies the selection criterion.

In some implementations, the result can include a first nonce value corresponding to the first hash value.

In some implementations, performing the one or more second computations can include generating a second hash value based on the second signal and the first nonce value. Determining whether the one or more second computations satisfies the selection criterion can include determining whether the second hash value satisfies the selection criterion.

In some implementations, the output data can represent whether the second hash value satisfies the selection criterion.

In some implementations, the first signal can be received from third data processing circuitry. A clock domain of the third data processing circuitry can be different from the clock domain of the second data processing circuitry.

In some implementations, the input data can represent a hash of a block header of a blockchain.

In some implementations, the blockchain can represent a distributed ledger representing one or more transactions.

In some implementations, the one or more transactions can be associated with a cryptocurrency.

In some implementations, the output data can indicate that the second hash value satisfies the selection criterion. The output data can include the nonce value.

In some implementations, the output data can further include a block header of a blockchain. The block header can include the nonce value.

In some implementations, the output data can represent that the second hash value does not satisfy the selection criterion.

In some implementations, a clock frequency of the first data processing circuitry can be different from a clock frequency of the second data processing circuitry.

In some implementations, the first data processing circuitry can include a plurality of sub-circuits, each configured to generate a respective portion of the plurality of hash values in parallel.

In some implementations, the first signal is not synchronized with the clock domain of the second data processing circuitry.

In another aspect, a method includes: receiving a first signal; generating, using clock synchronization circuitry, a second signal synchronized to a clock domain of second data processing circuitry; performing, using first data processing circuitry, one or more first computations based on the first signal; providing, to second processing circuitry, a result corresponding to the one or more first computations; performing, using the second data processing circuitry, one or more second computations based on the second signal; determining whether the one or more second computations satisfies a selection criterion; determining one or more errors associated with the one or more first computations by the first data processing circuitry; and generating output data based on the one or more errors.

Implementations of this aspect can include one or more of the following features.

In some implementations, the method can further include: comparing the first result to a second result corresponding to the one or more second computations, and determining the one or more errors based on the comparison.

In some implementations, the method can further include: determining that the first result matches the second result, and in response to determining that the first result matches the second result, including at least one of the first result or the second result in the output data.

In some implementations, the method can further include: determining that the first result does not match the second result, and in response to determining that the first result does not match the second result, omitting the first result and the second result from the output data.

In some implementations, performing the one or more first computations can include: generating, using first data processing circuitry, a plurality of hash values based on the first signal, where each of the plurality of hash values is generated using a different respective nonce value as an input, and determining that a first hash value of the one or more hash values satisfies the selection criterion.

In some implementations, the result can include a first nonce value corresponding to the first hash value.

In some implementations, performing the one or more second computations can include generating a second hash value based on the second signal and the first nonce value. Determining whether the one or more second computations satisfies the selection criterion can include determining whether the second hash value satisfies the selection criterion.

In some implementations, the output data can represent whether the second hash value satisfies the selection criterion.

In some implementations, the first signal can be received from third data processing circuitry. A clock domain of the third data processing circuitry can be different from the clock domain of the second data processing circuitry.

In some implementations, the input data can represent a hash of a block header of a blockchain.

In some implementations, the blockchain can represent a distributed ledger representing one or more transactions.

In some implementations, the one or more transactions can be associated with a cryptocurrency.

In some implementations, the output data can indicate that the second hash value satisfies the selection criterion. The output data can comprise the nonce value.

In some implementations, the output data can further include a block header of a blockchain. The block header can include the nonce value.

In some implementations, the output data can represent that the second hash value does not satisfy the selection criterion.

In some implementations, a clock frequency of the first data processing circuitry can be different from a clock frequency of the second data processing circuitry.

In some implementations, the method can also include generating, using each of a plurality of sub-circuits of the first data processing circuitry, a respective portion of the plurality of hash values in parallel.

In some implementations, the method can also include refraining from synchronizing the first signal with the clock domain of the second data processing circuitry.

In another aspect, a system includes: clock synchronization circuitry; first data processing circuitry; and second data processing circuitry electrically coupled to the clock synchronization circuitry and the first processing circuitry. The clock synchronization circuitry is configured to: receive a first signal, and output a second signal synchronized to a clock domain of the second data processing circuitry. The first data processing circuitry is configured to: perform one or more first data processing operations based on the first signal, determine that a first result of the one or more first data processing operations satisfies one or more criteria, and provide, to the second data processing circuitry, a first set of data representing the result. The second data processing circuitry is configured to: perform one or more second data processing operations based on the second signal, compare the first result to a second result of the one or more second data processing operations, determine one or more errors associated with the one or more first data processing operations by the first data processing circuitry, and generate output data based on the one or more errors.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers in the figures indicate like elements.

DETAILED DESCRIPTION

Figure 1:
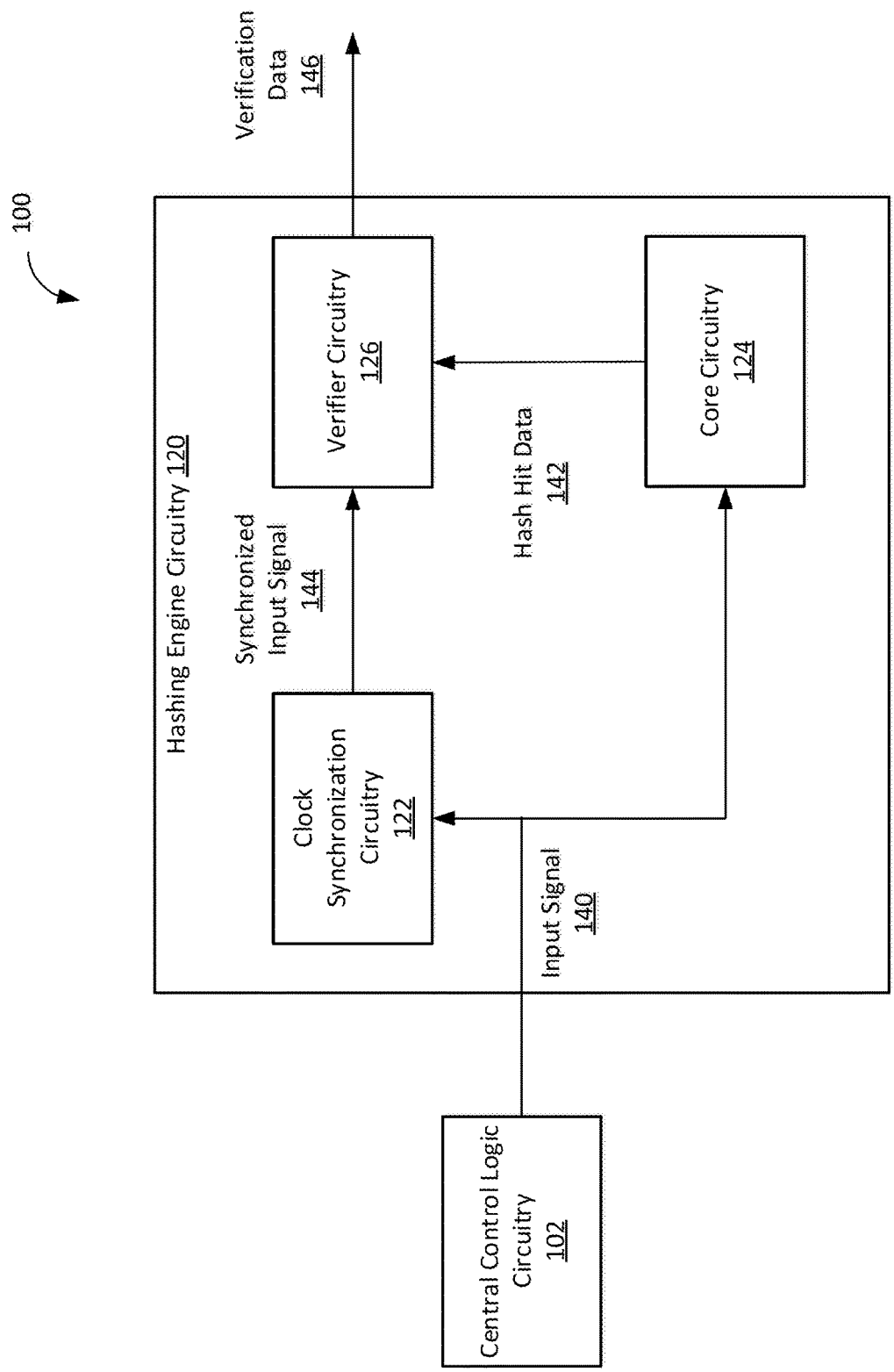
FIG. 1 illustrates a block diagram of an example system for generating hashes.

FIG. 1 illustrates a block diagram of an example system 100 for generating hashes, such as those used to generate hashes for cryptographic operations. The system 100 includes central control logic circuitry 102, and hashing engine circuitry 120. The hashing engine circuitry 120 includes clock synchronization circuitry 122, core circuitry 124, and verifier circuitry 126.

During an example operation of the system 100, the central control logic circuitry 102 generates an input signal 140, and provides the input signal 140 to the hashing engine circuitry 120 for processing.

In general, the central control logic circuitry 102 can have a different clock domain than that of the hashing engine circuitry 120 (and/or one or more of its constituent components). For example, the central control logic circuitry 102 can operate according to a first clock signal generated by a first clock generator (e.g., a first electronic oscillator), and the hashing engine circuitry 120 (and at least some of its constituent components) can operate according to a second clock signal generated by a second clock generator (e.g., a second electronic oscillator) that is not synchronized with the first clock generator. Due to the asynchronicity between the central control logic circuitry 102 and the hashing engine circuitry 120, metastability may arise during operation of the system 100 (e.g., when the hashing engine circuitry 120 samples the input signal 140 while the input signal 140 is in a state of transition).

To mitigate metastability, the hashing engine circuitry 120 performs hashing operations using the core circuitry 124 (e.g., using the input signal 140 as an input), and verifies the results of the hashing operations using verifier circuitry 126 (e.g., using a synchronized version of the input signal 140 as an input).

As an example, the core circuitry 124 is configured to receive the input signal 140 directly from the central control logic circuitry 102 (e.g., an input signal that has not been synchronized to the clock domain of the hashing engine circuitry 120 and/or the core circuitry 124), and generate one or more hashes using the input signal 140 as an input. For instance, at least a portion of the input signal 140 can represent an input sequence (e.g., an alphanumeric sequence, decimal sequence, hexadecimal sequence, binary sequence, etc.). Further, the hashing engine circuitry 120 can generate one or more hashes based on the input sequence (e.g., by inputting the input sequence into a hash function to generate a hash). Example hash functions include those from the Secure Hash Algorithm (SHA) family of functions (e.g., SHA-1, SHA-2, SHA-3, etc.), Cyclic Redundancy Check (CRC), MurmurHash, BLAKE2, and Argon 2, among others.

In some implementations, the core circuitry 124 is configured to generate one or more hashes based further on one or more nonce values (e.g., additional sequences of data, such as additional alphanumeric sequences, decimal sequence, hexadecimal sequence, binary sequence, etc.). As an example, the core circuitry 124 can be configured to receive the input signal 140 representing an input sequence. Further, the core circuitry 124 can be configured to generate several nonce values, and generate respective modified versions of the input sequence based on each of the nonce values. For instance, the can general several modified versions of the input sequence by concatenating the input sequence to different respective ones of the nonce values. Further, the core circuitry 124 can generate hashes based on the modified input sequences (e.g., by providing at least some of the input sequences to the hash function as input).

In some implementations, the core circuitry 124 is configured to generate one or more hashes until a generate hash satisfies one or more selection criteria. As an example, the core circuitry 124 can be configured to generate hashes continuously until the value of a generated hash is greater than, less than, or equal to a particular value. As another example, the core circuitry 124 can be configured to generate hashes continuously until a portion of the generated hash (e.g., a leading portion, a training portion, and/or a middle portion) is greater than, less than, or equal to a particular value.

In some implementations, the one or more selection criteria is associated with "mining" operations with respect to a cryptocurrency, for which transactions are maintained on a blockchain. For example, one or more computer systems can maintain a blockchain that represents a distributed ledger of transactions conducted using a cryptocurrency. The blockchain includes a list of records (e.g., "blocks") that are securely linked together via cryptographic hashes. Each block includes a cryptographic hash of the previous block, a timestamp, and transaction data. Because each block includes information about the previous block, they effectively form a "chain", with each additional block linking to the ones before it. Thus, blockchain transactions are immutable in that, once they are recorded, the data in any given block cannot be altered retroactively without altering all of the subsequent blocks.

Further, blocks of the blockchain can be cryptographically signed using a proof-of-work consensus mechanism, in which hashes are generated until a generated hash meets a particular set of selection criteria. Upon identifying a hash that meets that set of selection criteria, the generated hash (and/or its nonce value) is used to generate a cryptographically signature for a block. As an example, for the Bitcoin cryptocurrency, the input data to a hash function represents a previous block (e.g., a cryptographic signature of that block), one or more transactions to include in a new block, and a nonce value (e.g., a randomly selected value). The hash generated by the hash function meets the set of selection criteria (e.g., generated a "hash hit") when the hash begins with at least a specified number of zeros (e.g., 19 zeros in a row, or some other number of zeroes).

In general, the core circuitry 124 can generate hashes continuously (e.g., by generating multiple nonce values and generating hash values based on each of those nonce values) until the selection criteria are satisfied. Upon determining that a generated hash meets the selection criteria, the core circuitry provides hash hit data 142 to the verifier circuitry 126. In some implementations, the hash hit data 142 represents the nonce value that was used to generate a hash hit (e.g., the nonce value that, when concatenated with the input sequence of the input signal 140, resulted in a hash value that met the selection criteria).

In some implementations, the hash hit data 142 also includes additional information regarding a generated hash. For example, in some implementations, the core circuitry 124 includes multiple sub-circuits (e.g., two, three, four, or more) that perform hashing operations in parallel with one another. Each of these sub-circuits may be referred to as a respective "context" of the core circuitry 124. Upon determining that one of these sub-circuits generated a hash hit, the core circuitry 124 can indicate, in the hash hit data 142, the context that generated the hash hit.

Upon receiving the hash hit data 142, the verifier circuitry 126 verifies that the core circuitry 124 generated a hash hit.

In particular, the verifier circuitry 126 receives an instance 144 of the input signal 140 that has been synchronized to the clock domain of the verifier circuitry 126 (e.g., using the clock synchronization circuitry 122). For example, the clock synchronization circuitry 122 can include one or more components (e.g., flip-flops, latches, etc.) that are configured such that changes to the input signal 140 are synchronized to changes in the clock signal of the verifier circuitry 126 (e.g., to mitigate metastability between the central control logic circuitry 102 and the verifier circuitry 126).

Further, the verifier circuitry 126 generates a hash using the synchronized input signal 144 and the nonce value indicated in the hash hit data 142 as inputs to a hash function (e.g., by concatenating the input sequence of the input signal 140 with the nonce value, and providing the concatenated sequence to the hash function). The verifier circuitry 126 compares the generated hash to that generated by the core circuitry 124, and generates verification data 146 indicating whether there is a match. In some implementations, the verification data 146 can be provided to the central control logic circuitry 102 and/or to one or more other circuitry for storage (e.g., using one or more computer storage devices, such as hard drives, transitory memory, non-transitory memory, etc.) and/or further processing For example, if the hash generated by the verifier circuitry 126 matches the hash function generated by the core circuitry 124, the verifier circuitry 126 can generate verification data 146 indicating that the generated hashes match one another. Further, the verifier circuitry 126 can include, in the verification data, the input sequence, the nonce value, and/or the generated hash.

Further, the verifier circuitry 126 can include, in the verification data 146, data to facilitate the generation of a new block in a blockchain. For example, the verification data 146 can include a blockchain header that includes a cryptographic signature (e.g., generated using the input sequence, the nonce value, and/or the hash).

As another example, if the hash generated by the verifier circuitry 126 does not match the hash function generated by the core circuitry 124, the verifier circuitry 126 can generate verification data 146 indicating that the generated hashes do not match one another (e.g., indicating that an error occurred). In some implementations, the verifier circuitry 126 can refrain from outputting the generated hash(es) (e.g., such that erroneous results are not reported to other components of the system 100).

In some implementations, the verifier circuitry 126 can include, in the verification data 146, data to facilitate diagnosis of the error. For example, the verification data 146 can indicate the time that the hash(es) was generated by the core circuitry 124 and/or the verifier circuitry 126, the generated hash(es), the context of the core circuitry 124 that generated the hash, etc. As another example, the verification data 146 can indicate the number of errors that occurred within a particular window of time.

In general, one or more of the components of the system 100 (e.g., the central control logic circuitry 102, hashing engine circuitry 120, clock synchronization circuitry 122, core circuitry 124, and/or verifier circuitry 126 can be implemented, at least in part, as one or more groups or modules of digital electronic circuitry, computer software, firmware, or hardware, or in combinations of one or more of them. In some implementations, at least some of these components can be implemented using one or more processors, such as one or more generalized computer processors and/or special purpose logic circuitry, for example, an ASIC (application specific integrated circuit) chip or a FPGA (field programmable gate array) chip.

In some implementations, the core circuitry 124 and the verifier circuitry 126 operate according to different clock speeds. For example, the core circuitry 124 can operate according to a clock speed that is higher than that of the verifier circuitry 126. As another example, the core circuitry 124 can operate according to a clock speed that is lower than that of the verifier circuitry 126.

In some implementations, the core circuitry 124 and the verifier circuitry 126 operate according to the same clock speed.

As described above, the system 100 can provide various technical benefits. For example, the hashing engine circuitry 120 can generate a greater number of hashes over a particular period of time (e.g., compared to hashing engine circuitry that do not have the arrangements described herein). As another example, the hashing engine circuitry 120 can generate a greater number of hashes using a particular power allotment (e.g., compared to hashing engine circuitry that do not have the arrangements described herein). Accordingly, the hashing engine circuitry 120 can operate more effectively, while also using fewer resources.

For instance, the core circuitry 124 can generate a large number of hashes given an input signal 140 sequentially and/or in parallel, without the input signal 140 being synchronized with the clock domain of the core circuitry 124 (which may otherwise slow the hashing operations of the core circuitry 124). Upon the core circuitry 124 generating a hash hit, the hash hit can be verified using the verifier circuitry 126 (e.g., using a synchronized input signal 144, rather than the unsynchronized input signal 140). Accordingly, the hashing engine circuitry can determine, with an enhanced degree of reliability, whether the hash hits generated by the core circuitry 124 were correctly generated or were generated in error.

In particular, in at least some implementations, a hashing engine generates a large number of hashes than do not meet certain selection criteria, before generating a hash that does meet the selection criteria. Thus, the configuration(s) of the hashing engine circuitry 120 described herein provide speed and/or efficiency improvements (e.g., during the primary hashing process by the core circuitry 124), while mitigating the effects of metastability due to differences in the clock domains between the central control logic circuitry 102 and the hashing engine circuitry 120.

Although the systems and techniques described herein are presented in the context of generating hashes (e.g., hashes for cryptographic operations), the implementations can be used to facilitate the performance of any computer operations. For example, the core circuitry 124 can be configured to perform any operations without a synchronized input signal, and the verifier circuitry 126 can be configured to verify at least some of the results generated by the core circuitry 124 (e.g., by re-performing at least some of the operations using a synchronized input signal).

This configuration may be particularly advantageous in situations in which the operations performed by the core circuitry 124 are expect to produce a "successful" result (e.g., a result meeting certain selection criteria) relatively rarely (e.g., the operations are expected to be performed a large number of times before a successful result is obtained). For example, the core circuitry 124 can be quickly and efficiently generate a large number of results until a successful result is obtained, without using the clock synchronization circuitry 122 to produce a synchronization input signal (e.g., which may slow down the operation of the core circuitry 124, increase power consumption by the overall system, and/or increase the size and complexity of the overall system). Upon the core circuitry 124 generating a successful result, the verifier circuitry 126 can verify the successful result using a synchronized input signal (e.g., to reduce of likelihood of error in the operations).

Example Processes

Figure 2:
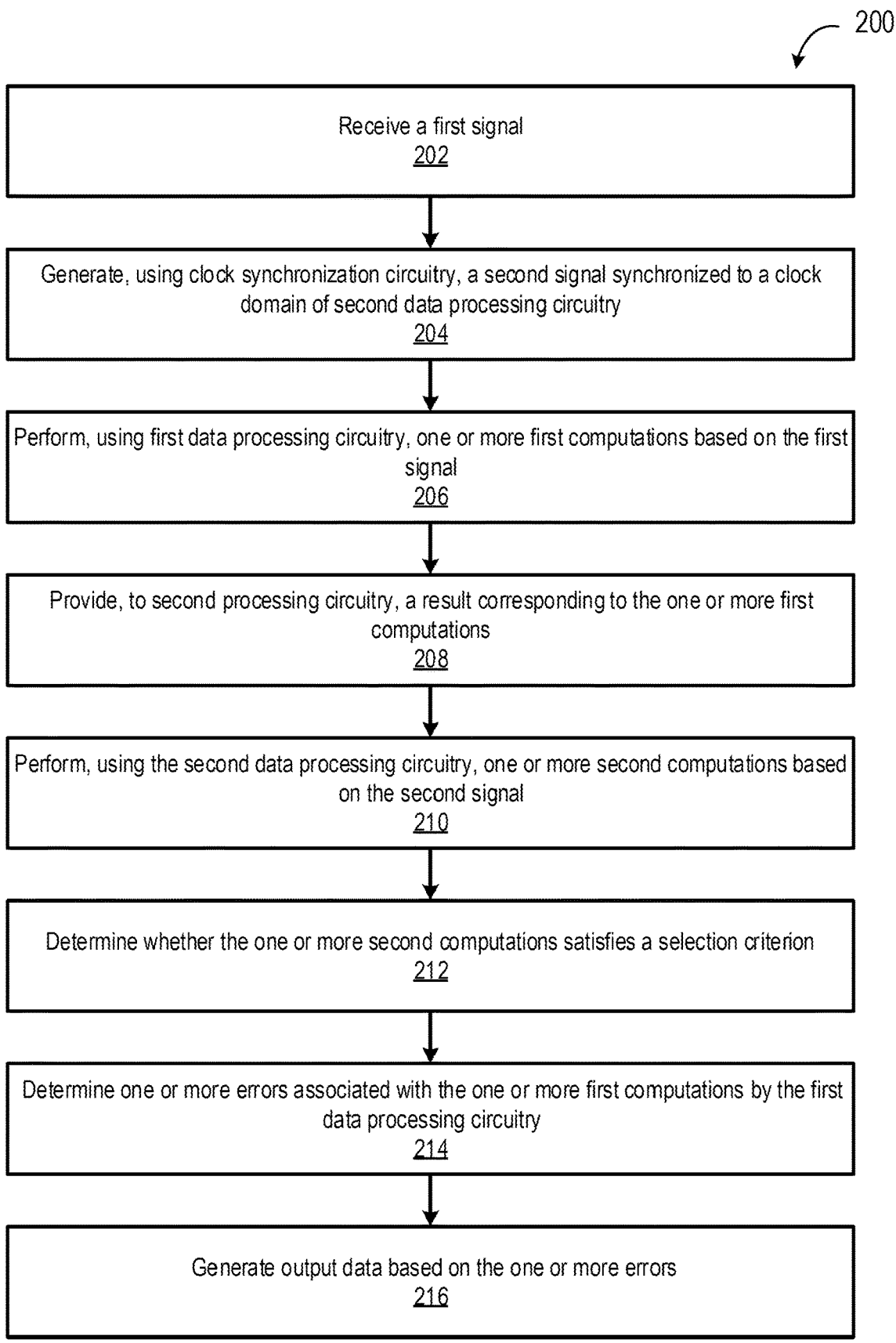
FIG. 2 illustrates an example process for generating hashes.

FIG. 2 illustrates an example process 200 for generating hashes. In some implementations, the process 200 can be performed by the system 100 described in this disclosure (for example, the system 100 including the hashing engine circuitry 120 and described with reference to FIG. 1) using one or more processors (for example, using the processor or processors 310 shown in FIG. 3).

In the process 200, a system receives a first signal (202). In some implementations, the input data can represent a hash of a block header of a blockchain. Further, the blockchain can represent a distributed ledger representing one or more transactions. For example, the one or more transactions are associated with a cryptocurrency (e.g., Bitcoin).

The system generates, using clock synchronization circuitry, a second signal synchronized to a clock domain of second data processing circuitry (204).

The system performs, using first data processing circuitry, one or more first computations based on the first signal (206).

The system provides, to second processing circuitry, a result corresponding to the one or more first computations (208).

The system performs, using the second data processing circuitry, one or more second computations based on the second signal (210).

The system determines whether the one or more second computations satisfies a selection criterion (212).

The system determines one or more errors associated with the one or more first computations by the first data processing circuitry (214).

The system generates output data based on the one or more errors. (216).

In some implementations, the process 200 can also include comparing the first result to a second result corresponding to the one or more second computations, and determining the one or more errors based on the comparison.

For example, the system can determine that the first result matches the second result, and in response, include at least one of the first result or the second result in the output data (e.g., such that the first result and/or the second result is reported to another component, such as the central control logic circuitry 102).

As another example, the system can determine that the first result does not match the second result, and in response, omit the first result and the second result from the output data (e.g., such that the results are not reported to another component, such as the central control logic circuitry 102).

In some implementations, performing the one or more first computations can include generating, using first data processing circuitry, a plurality of hash values based on the first signal, where each of the plurality of hash values is generated using a different respective nonce value as an input. Further, a determination can be made that a first hash value of the one or more hash values satisfies the selection criterion. Further, the result that is provided to the second data processing circuitry can include a first nonce value corresponding to the first hash value.

In some implementations, performing the one or more second computations can include generating a second hash value based on the second signal and the first nonce value. Further, determining whether the one or more second computations satisfies the selection criterion can include determining whether the second hash value satisfies the selection criterion. In some implementations, the output data can represent whether the second hash value satisfies the selection criterion.

In some implementations, the output data can indicate that the second hash value satisfies the selection criterion. Further, the output data can include the nonce value. In some implementations, the output data further can include a block header of a blockchain. Further, the block header can include the nonce value.

In some implementations, the output data can represent that the second hash value does not satisfy the selection criterion.

In some implementations, a clock frequency of the first data processing circuitry can be different from a clock frequency of the second data processing circuitry.

In some implementations, the first signal can be received from third data processing circuitry. Further, a clock domain of the third data processing circuitry can be different from the clock domain of the second data processing circuitry.

In some implementations, the process can also include generating, using each of a plurality of sub-circuits of the first data processing circuitry, a respective portion of the plurality of hash values in parallel.

In some implementations, the process can also include refraining from synchronizing the first signal with the clock domain of the second data processing circuitry.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 (e.g., the central control logic circuitry 102, hashing engine circuitry 120, etc.) can be implemented using digital electronic circuitry, or in computer software, firmware, or hardware, or in combinations of one or more of them. In another example, the process 200 shown in FIG. 2 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 3:
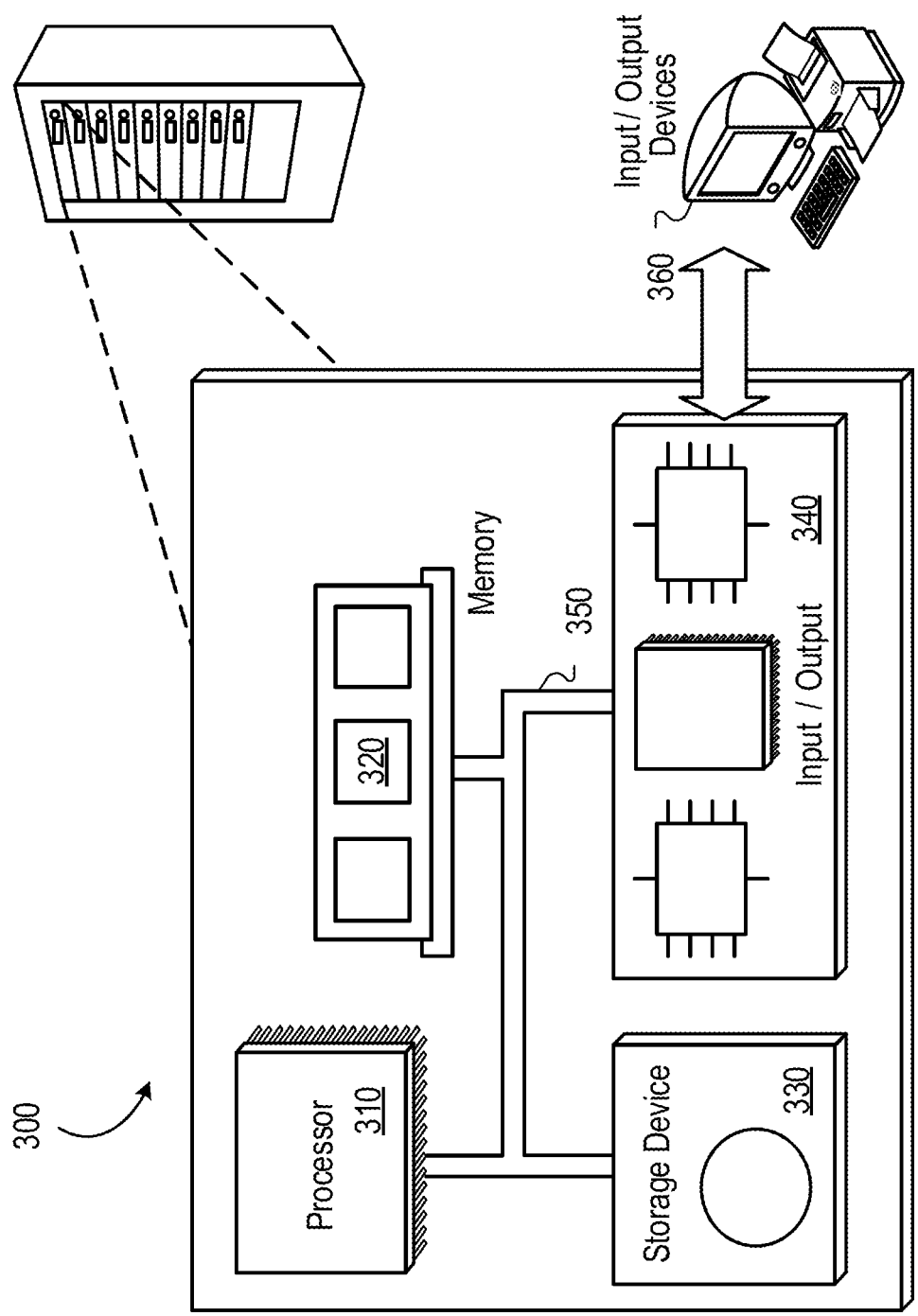
FIG. 3 illustrates an example computer system.

FIG. 3 illustrates an example computer system 300 that includes a processor 310, a memory 320, a storage device 330 and an input/output device 340. Each of the components 310, 320, 330 and 340 can be interconnected, for example, by a system bus 350. The processor 310 is capable of processing instructions for execution within the system 300. In some implementations, the processor 310 is a single-threaded processor, a multi-threaded processor, or another type of processor. The processor 310 is capable of processing instructions stored in the memory 320 or on the storage device 330. In some implementations, the central control logic circuitry 102, the hashing engine circuitry 120 (and at least some of its constituent components) can be implemented using the processors 310 and/or using multiple such processors 310. The memory 320 and the storage device 330 can store information within the system 300.

The input/output device 340 provides input/output operations for the system 300. In some implementations, the input/output device 340 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 360. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A system comprising:
   clock synchronization circuitry;
   first data processing circuitry; and
   second data processing circuitry electrically coupled to the clock synchronization circuitry and the first processing circuitry,
   wherein the clock synchronization circuitry is configured to:
      receive a first signal synchronized according to a first clock domain, and
      output a second signal that represents the first signal synchronized to a second clock domain of the second data processing circuitry, wherein the first clock domain is different from the second clock domain,
   wherein the first data processing circuitry is configured to:
      perform one or more first computations based on the first signal, and
      provide, to the second data processing circuitry, a first result corresponding to the one or more first computations, and
   wherein the second data processing circuitry is configured to:
      perform one or more second computations based on the second signal,
      determine whether the one or more second computations satisfies a selection criterion,
      determine, based on the first result and a second result corresponding to the one or more second computations, one or more errors associated with the one or more first computations by the first data processing circuitry, and
      generate output data based on the one or more errors.

2. The system of claim 1, wherein the second data processing circuitry is further configured to:
   compare the first result to the second result, and
   determine the one or more errors based on the comparison.

3. The system of claim 2, wherein the second data processing circuitry is further configured to:
   determine that the first result matches the second result, and
   in response to determining that the first result matches the second result, include at least one of the first result or the second result in the output data.

4. The system of claim 2, wherein the second data processing circuitry is further configured to:
   determine that the first result does not match the second result, and
   in response to determining that the first result does not match the second result, omit the first result and the second result from the output data.

5. The system of claim 1, wherein performing the one or more first computations comprises:
   generating a plurality of hash values based on the first signal, wherein each of the plurality of hash values is generated using a different respective nonce value as an input, and
   determining that a first hash value of the one or more hash values satisfies the selection criterion.

6. The system of claim 5, wherein the first result comprises a first nonce value corresponding to the first hash value.

7. The system of claim 6, wherein performing the one or more second computations comprises generating a second hash value based on the second signal and the first nonce value, and
   wherein determining whether the one or more second computations satisfies the selection criterion comprises determining whether the second hash value satisfies the selection criterion.

8. The system of claim 7, wherein the output data indicates that the second hash value satisfies the selection criterion, and wherein the output data comprises the first nonce value.

9. The system of claim 8, wherein the output data further comprises a block header of a blockchain, and wherein the block header comprises the first nonce value.

10. The system of claim 6, wherein the output data represents whether the second hash value satisfies the selection criterion.

11. The system of claim 10, wherein the output data represents that the second hash value does not satisfy the selection criterion.

12. The system of claim 10, wherein the first data processing circuitry comprises a plurality of sub-circuits, each configured to generate a respective portion of the plurality of hash values in parallel.

13. The system of claim 1, wherein the first signal is received from third data processing circuitry, and wherein a third clock domain of the third data processing circuitry is different from the second clock domain of the second data processing circuitry.

14. The system of claim 1, wherein the first signal represents a hash of a block header of a blockchain.

15. The system of claim 14, wherein the blockchain represents a distributed ledger representing one or more transactions.

16. The system of claim 15, wherein the one or more transactions are associated with a cryptocurrency.

17. The system of claim 1, wherein a clock frequency of the first data processing circuitry is different from a clock frequency of the second data processing circuitry.

18. The system of claim 1, wherein the first signal is not synchronized with the second clock domain of the second data processing circuitry.

19. A system comprising:
clock synchronization circuitry;
first data processing circuitry; and
second data processing circuitry electrically coupled to the clock synchronization circuitry and the first processing circuitry,
wherein the clock synchronization circuitry is configured to:
  receive a first signal synchronized according to a first clock domain, and
  output a second signal that represents the first signal synchronized to a second clock domain of the second data processing circuitry, wherein the first clock domain is different from the second clock domain,
wherein the first data processing circuitry is configured to:
  perform one or more first data processing operations based on the first signal,
  determine that a first result of the one or more first data processing operations satisfies one or more criteria, and
  provide, to the second data processing circuitry, a first set of data representing the result, and
wherein the second data processing circuitry is configured to:
  perform one or more second data processing operations based on the second signal,
  compare the first result to a second result of the one or more second data processing operations,
  determine, based on the comparison of the first result and the second result, one or more errors associated with the one or more first data processing operations by the first data processing circuitry,
  generate output data based on the one or more errors.

20. A method comprising: receiving a first signal synchronized according to a first clock domain; generating, using clock synchronization circuitry, a second signal that represents the first signal synchronized to a second clock domain of second data processing circuitry, wherein the first clock domain is different from the second clock domain; performing, using first data processing circuitry, one or more first computations based on the first signal; providing, to second processing circuitry, a result corresponding to the one or more first computations; performing, using the second data processing circuitry, one or more second computations based on the second signal; determining whether the one or more second computations satisfies a selection criterion; determining, based on the first result and a second result corresponding to the one or more second computations, one or more errors associated with the one or more first computations by the first data processing circuitry; and generating output data based on the one or more errors.

* * * * *